US009626040B2

(12) United States Patent
Wallander et al.

(10) Patent No.: US 9,626,040 B2
(45) Date of Patent: Apr. 18, 2017

(54) TOUCH-SENSITIVE APPARATUS WITH IMPROVED SPATIAL RESOLUTION

(71) Applicant: FlatFrog Laboratories AB, Lund (SE)

(72) Inventors: Mats Petter Wallander, Lund (SE); Håkan Bergström, Torna-Hallestad (SE)

(73) Assignee: FLATFROG LABORATORIES AB, Lund (SE)

( * ) Notice: Subject to any disclaimer, the term of this patent is extended or adjusted under 35 U.S.C. 154(b) by 60 days.

(21) Appl. No.: 14/402,519

(22) PCT Filed: May 22, 2013

(86) PCT No.: PCT/SE2013/050585
§ 371 (c)(1),
(2) Date: Nov. 20, 2014

(87) PCT Pub. No.: WO2013/176615
PCT Pub. Date: Nov. 28, 2013

(65) Prior Publication Data
US 2015/0138158 A1 May 21, 2015

(30) Foreign Application Priority Data
May 23, 2012 (SE) ...................... 1250520

(51) Int. Cl.
G06F 3/042 (2006.01)
(52) U.S. Cl.
CPC .... *G06F 3/042* (2013.01); *G06F 2203/04109* (2013.01)
(58) Field of Classification Search
CPC ...................................... G06F 3/042
See application file for complete search history.

(56) References Cited

U.S. PATENT DOCUMENTS 3,673,327 A 6/1972 Johnson et al.
4,254,333 A 3/1981 Bergstrom
(Continued)

FOREIGN PATENT DOCUMENTS

WO WO-2009/077962 A2 6/2009
WO WO-2010/006883 A2 1/2010
(Continued)

OTHER PUBLICATIONS

Kak, Avinash C. and Malcolm Slaney. *Principles of Computerized Tomographic Imaging*. New York: IEEE Press, 1988.
(Continued)

*Primary Examiner* — Alexander Eisen
*Assistant Examiner* — Cory Almeida
(74) *Attorney, Agent, or Firm* — Harness, Dickey & Pierce PLC

(57) ABSTRACT

A touch-sensitive apparatus is configured to propagate energy inside a panel (1) so as to define a grid of transmission paths across a touch surface (4) of the panel (1). The apparatus comprises a first subset of components on a first end of the touch surface (4), and a second subset of components on a second end which is opposite to and parallel with the first end. The components include emitters and detectors, each emitter being operable for propagating a diverging energy beam (e.g. radiation) across the touch surface (4) inside the panel (1), and each detector being operable for detecting transmitted energy from at least two emitters. The components in at least one of the first and second subsets are systematically arranged in spatially separate groups along at least one of the first and second ends, so as to achieve a reduced spacing and/or an increased uniformity of the transmission paths along a center line between the first and second ends compared to an equidistant arrangement of all components.

11 Claims, 5 Drawing Sheets

(56) References Cited

U.S. PATENT DOCUMENTS

| | | |
|---|---|---|
| 6,429,857 B1 | 8/2002 | Masters et al. |
| 6,690,363 B2 | 2/2004 | Newton |
| 7,042,444 B2 | 5/2006 | Cok |
| 7,432,893 B2 | 10/2008 | Ma et al. |
| 7,855,716 B2 | 12/2010 | McCreary et al. |
| 2006/0114237 A1 | 6/2006 | Crockett et al. |
| 2009/0153519 A1 | 6/2009 | Suarez Rovere |
| 2010/0066016 A1 | 3/2010 | Van De Wijdeven et al. |
| 2011/0115748 A1* | 5/2011 | Xu ................ G06F 3/0421 345/175 |
| 2011/0157096 A1 | 6/2011 | Drumm |
| 2011/0227874 A1* | 9/2011 | Fahraeus ......... G06F 3/0421 345/175 |
| 2011/0234537 A1 | 9/2011 | Kim et al. |
| 2011/0261020 A1 | 10/2011 | Song et al. |

FOREIGN PATENT DOCUMENTS

| | | |
|---|---|---|
| WO | WO-2010/015408 A1 | 2/2010 |
| WO | WO-2010/046539 A1 | 4/2010 |
| WO | WO-2010/064983 A2 | 6/2010 |
| WO | WO-2010/081702 A2 | 7/2010 |
| WO | WO-2010/112404 A1 | 10/2010 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/062471 A2 | 5/2013 |
| WO | WO-2013/089622 A2 | 6/2013 |

OTHER PUBLICATIONS

Natterer, Frank. *The Mathematics of Computerized Tomography.* New York: Society for Industrial and Applied Mathematics, 1986.

\* cited by examiner

TOUCH-SENSITIVE APPARATUS WITH IMPROVED SPATIAL RESOLUTION

CROSS-REFERENCE TO RELATED APPLICATIONS

This application is a national phase under 35 U.S.C. §371 of PCT International Application No. PCT/SE2013/050585 which has an International filing date of May 22, 2013, which claims priority to Sweden patent application number SE 1250520-2 filed May 23, 2012 and U.S. provisional patent application No. 61/650,618 filed May 23, 2012.

TECHNICAL FIELD

The present invention relates to a touch-sensitive apparatus that operates by propagating energy beams across a touch surface inside a panel.

BACKGROUND ART

This type of touch-sensitive apparatus is known in the art. It may be implemented to operate by transmitting light inside a solid light transmissive panel, which defines two parallel boundary surfaces connected by a peripheral edge surface. Light generated by a plurality of emitters is coupled into the panel so as to propagate by total internal reflection (TIR) between the boundary surfaces to a plurality of detectors. The light thereby defines propagation paths across the panel, between pairs of emitters and detectors. The emitters and detectors are arranged such that the propagation paths define a grid on the panel. An object that touches one of the boundary surfaces ("the touch surface") will attenuate ("frustrate") the light on one or more propagation paths and cause a change in the light received by one or more of the detectors. The location (coordinates), shape or area of the object may be determined by analyzing the received light at the detectors. This type of apparatus has an ability to detect plural objects in simultaneous contact with the touch surface, known as "multi-touch" in the art.

In one configuration, e.g. disclosed in U.S. Pat. Nos. 3,673,327, 4,254,333 and US2006/0114237, the emitters and detectors are arranged in rows on opposite ends of the panel, and the light is propagated between opposite pairs of emitters and detectors so as to define a rectangular grid of propagation paths.

As an alternative, U.S. Pat. No. 7,432,893 proposes the use of a few large emitters arranged at the corners of the panel, or centrally on each end of the panel, to inject diverging light beams ("fan beams") into the panel for receipt by arrays of detectors along all ends of the panel. This configuration may enable an increased spatial resolution for a given number of emitters and detectors, by increasing the density of the grid of propagation paths. The spatial resolution indicates the smallest object that can be detected by the touch-sensitive apparatus at a given location on the touch surface.

In an alternative configuration, e.g. disclosed in WO2009/077962, US2011/0234537, US2011/0157096, rows of regularly spaced fan beam emitters and detectors, respectively, are arranged on opposite ends of the panel to define a dense grid of propagation paths across the touch surface.

WO2010/064983 discloses further alternative configurations. In one configuration, which is intended to improve the uniformity of the grid of propagation paths, fan beam emitters and detectors are alternated with equal spacing around the periphery of the touch surface. In another configuration, which is intended to reduce interference phenomena that may occur when different emitters concurrently inject light of the same wavelength into the panel, fan beam emitters and detectors are arranged with randomized spacing around the periphery of the touch surface.

US 2009/0153519 discloses providing alternating emitter and detector ports around the panel. Alternatively, a unique electrode can serve both purposes of emitter and receiver.

In this type of touch-sensitive apparatus, there is a continued desire to improve the spatial resolution with respect to the uniformity of the spatial resolution across the touch surface or the minimum detectable object size at a given position on the touch surface.

SUMMARY

It is an objective of the invention to at least partly overcome one or more limitations of the prior art.

Another objective is to enable an improved spatial resolution for a given number of electro-optical components in a touch-sensitive apparatus that operates by propagating energy beams across a touch surface inside a panel.

One or more of these objectives, as well as further objectives that may appear from the description below, are at least partly achieved by means of a touch-sensitive apparatus according to the independent claims, embodiments thereof being defined by the dependent claims.

One aspect of the invention is a touch-sensitive apparatus which comprises: a panel defining a touch surface; a first subset of components on a first end of the touch surface; and a second subset of components on a second end of the touch surface, the second end being opposite to and parallel with the first end. The components include emitters and detectors, each emitter being operable for propagating a diverging energy beam across the touch surface inside the panel, and each detector being operable for detecting transmitted energy from at least two emitters. The components in at least one of the first and second subsets are systematically arranged in spatially separate groups, each with at least two components, along at least one of the first and second ends.

This aspect is based on the insight that conventional configurations that propagate diverging energy beams and have first and second subsets of equispaced components on opposite first and second ends of the touch surface will result in a convergence of the propagation paths towards the center line between the opposite subsets. Thereby, the grid of propagation paths will exhibit increased gaps without propagation paths near the center line, which is equal to a locally reduced spatial resolution. By arranging the components in at least one of the first and second subsets in spatially separate groups along at least one of the first and second ends, the convergence of the propagation paths may be avoided or reduced and the propagation paths may be more distributed along the center line. By proper design of the groups, the first aspect thus provides an increased uniformity and/or a reduced spacing of propagation paths, at least near the center line, for a given number of components, compared to an equidistant arrangement of the components in the first and second subsets.

It should be noted that the components are systematically arranged in spatially separate groups, which indicates that the center-to-center spacing between adjacent components in different groups is larger than the center-to-center spacing between adjacent components within each group. The center-to-center spacing may also be denoted a "pitch". The systematic arrangement in groups is contrasted by a randomized arrangement, which generally does not result in any ordered or systematic grouping of components. The arrangement of the components into spaced-apart groups may be systematic in different respects, e.g. by having the same number of components in all groups in a subset, by having the same distance between all groups in a subset, by having the same distance between the components within all groups in a subset, by having the same combination of components within all groups in a subset, or by having the same ordering of components within all groups in a subset.

In one embodiment, all groups include the same number of components, e.g. two or three components. This may facilitate the design and manufacture of the apparatus.

In one embodiment, each of the first and second subsets contains an alternating sequence of emitters and detectors.

In one embodiment, the components in both the first subset and the second subset are systematically arranged in spatially separate groups along the first and second ends. For example, the groups in the first subset may consist of a sequence of one emitter and one detector with respect to a reference direction along the first and second ends, and the groups in the second subset may consist of a sequence of one detector and one emitter with respect to the reference direction.

In another embodiment, the first subset contains only emitters and the second subset contains only detectors.

In one embodiment, the components in the first subset are systematically arranged in spatially separate groups along the first end, and the components in the second subset are arranged with equidistant spacing along at least the second end.

In one embodiment, said at least one of the first and second subsets have an inter-group spacing between the groups and an intra-group spacing between the components within each group, such that a ratio of the inter-group spacing to the intra-group spacing is greater than 1.2, and possibly in the range of 1.3-8. In one embodiment, the groups in said at least one of the first and second subsets have equal intra-group spacing and equal inter-group spacing. In one embodiment, the groups in said at least one of the first and second subsets have equal intra-group spacing and systematically varying inter-group spacing. In another embodiment, the groups in said at least one of the first and second subsets have equal inter-group spacing and systematically varying intra-group spacing. In yet another embodiment, the groups in said at least one of the first and second subsets have systematically varying inter-group spacing and systematically varying intra-group spacing. The use of varying inter-group and/or intra-group spacing may serve to further reduce the spacing of propagation paths along the center line.

In one embodiment, the first and second subsets define a grid of transmission paths between the emitters and the detectors, wherein the groups are systematically arranged so as to generate a decreased spacing of transmission paths along a center line between the first and second ends compared to an equidistant arrangement of the components in the first and second subsets. Such an embodiment may serve to increase the spatial resolution of the touch-sensitive apparatus for a given number of components.

In one embodiment, the first and second subsets define transmission paths between the emitters and the detectors, said transmission paths forming intersection points with a center line between first and second ends, wherein the groups are systematically arranged so as to generate a decreased average number of transmission paths per intersection point compared to an equidistant arrangement of the components in the first and second subsets. Such an embodiment may serve to reduce the impact of the individual intersections on the transmitted energy measured by individual detectors, and thereby reduce a difference in touch sensitivity along the center line in relation to other parts of the touch surface. This has been found to reduce the occurrence of artifacts caused by systematic errors and noise when using certain image reconstruction algorithms for reconstructing a two-dimensional distribution of interaction or "attenuation" across the touch surface based on the transmitted energy detected by the detectors.

In one embodiment, the components are electro-optical components that are configured to generate radiation and detect radiation, respectively.

In one embodiment, the panel defines a front surface and a back surface, wherein the emitters are operable for propagation of diverging beams of radiation by internal reflections in the front and back surfaces, and wherein the front surface comprises the touch surface and is configured to allow the diverging beams of radiation to be attenuated by objects in contact with the touch surface. The back surface may be an external or internal surface of the panel.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
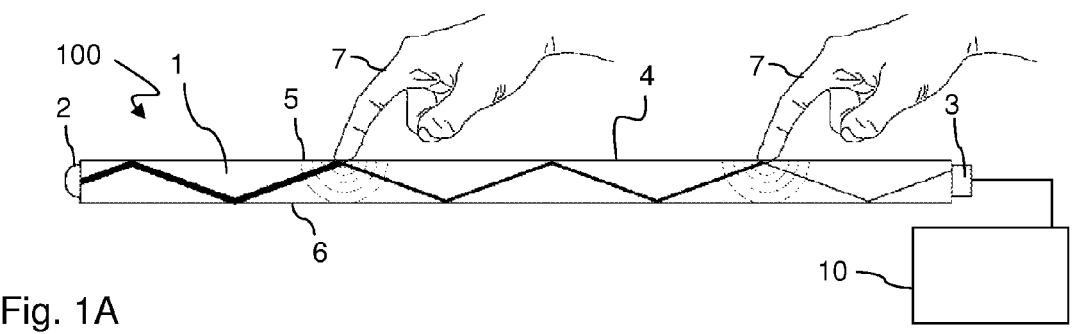
FIGS. 1A-1B are section and top plan views of an optical touch-sensitive apparatus.

In the following, examples of the present invention will be given in relation to a touch-sensitive apparatus designed to operate by light transmission. Throughout the description, the same reference numerals are used to identify corresponding elements.

Figure 1B:
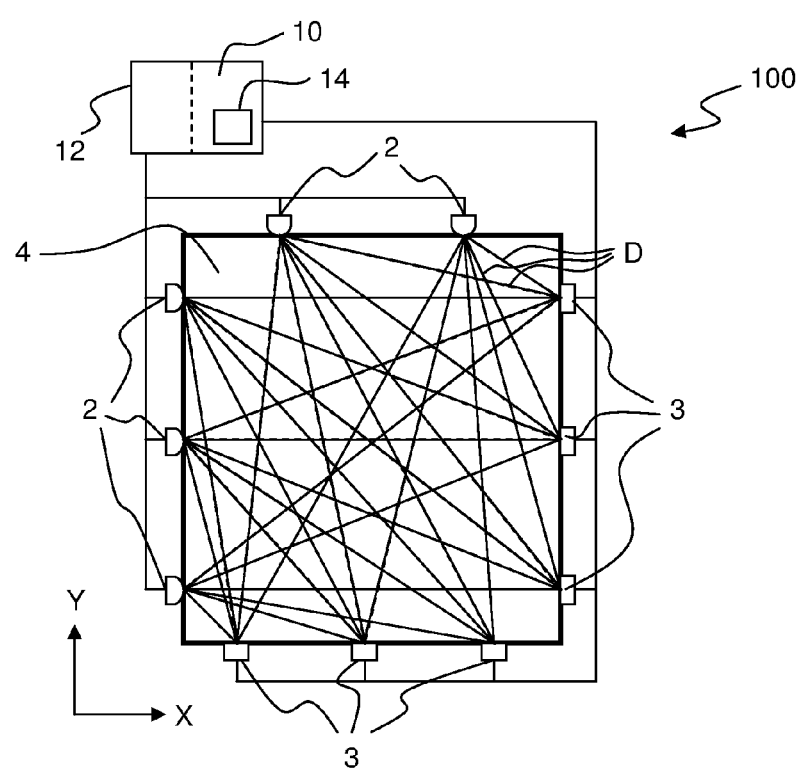

FIGS. 1A-1B illustrate an example embodiment of a touch-sensitive apparatus 100 that is based on the concept of FTIR (Frustrated Total Internal Reflection). The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (or equivalently, the power or intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. Each light sheet is formed as a beam of light that expands (as a "fan beam") in the plane of the panel 1 while propagating in the panel 1 from a respective incoupling region/point on the panel 1. The detectors 3 are distributed along the perimeter of the touch surface 4 to receive the light from the emitters 2 at a number of spaced-apart outcoupling regions/points on the panel 1. It should be understood that the incoupling and outcoupling regions/points merely refer to the positions where the beams enter and leave, respectively, the panel 1. The light from each emitter 2 will propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as shown in FIG. 1B. Thereby, the emitters 2 and detectors 3 collectively define a grid of detection lines D ("detection grid") on the touch surface 4. The spacing of intersections in the detection grid defines the spatial resolution of the apparatus 100, i.e. the smallest object than can be detected on the touch surface 4.

The detectors 3 collectively provide an output signal, which is received and sampled by a signal processor 10. The output signal contains a number of sub-signals, also denoted "projection signals", each representing the energy of light emitted by a certain light emitter 2 and received by a certain light detector 3. Depending on implementation, the signal processor 10 may need to process the output signal for separation of the individual projection signals. The projection signals represent the received energy, intensity or power of light received by the detectors 3 on the individual detection lines D. When-ever an object touches a detection line, the received energy on this detection line is decreased or "attenuated".

The signal processor 10 may be configured to process the projection signals so as to determine a property of the touching objects, such as a position (e.g. in the x,y coordinate system shown in FIG. 1B), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 2. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of a touch-sensitive apparatus. For example, instead of injecting and detecting light via the edge surface that connects the boundary surfaces 5, 6, light may be coupled into and/or out of the panel 1 via the top and/or bottom surfaces 5, 6, e.g. by the use of dedicated coupling elements attached to the panel 1. It is also conceivable that the light is coupled into and out of the panel 1 through different portions of the panel, e.g. via the boundary surface 5 and the boundary surface 6, respectively. Examples of alternative FTIR-based touch systems are e.g. disclosed in U.S. Pat. No. 7,432,893, WO2010/046539, WO2012/105893, and PCT/SE2012/051368 filed on Dec. 10, 2012, which are all incorporated herein by this reference.

Embodiments of the invention apply a systematic grouping of the emitters and detectors along the perimeter of the touch surface 4 to achieve desired properties of the detection grid on the touch surface 4, as will be further explained in relation to the top plan views in FIGS. 3A-3H. Each of FIGS. 3A-3H illustrates a grid of detection lines that are defined between rows of emitters (open circles) and detectors (open squares) on opposite ends or sides of a touch surface (not shown). A dotted line indicates the center line C between the rows of emitters and detectors, and small dots indicate the intersections of the detection lines with the center line C. For ease of presentation, the panel 1 has been omitted in FIGS. 3A-3H.

Figure 3A:
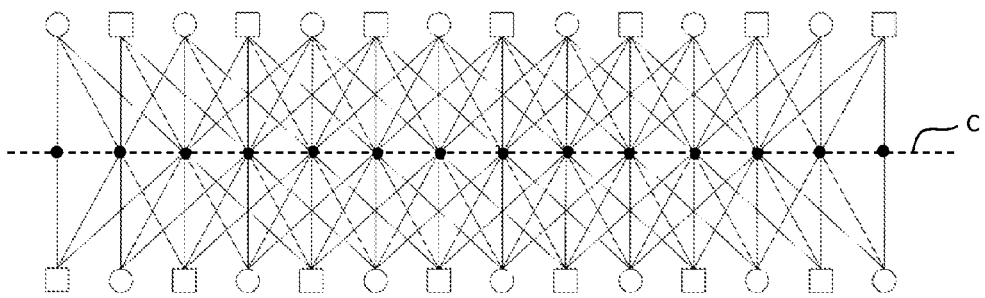
FIG. 3A illustrate a grid of detection lines in a prior art apparatus with interleaved emitters and detectors.

In a conventional fan beam arrangement, denoted "interleaved arrangement" herein and shown in FIG. 3A, emitters and detectors are arranged in alternating fashion with equal spacing in two rows along opposite ends of the touch surface. The interleaved arrangement results in a symmetric detection grid, and each intersection point on the center line C contains a large number of detection lines. As shown, the maximum spacing of intersections in the detection grid occurs on the center line C. In other words, the center line C defines the spatial resolution of the grid of detection lines that extend between the rows of alternating emitters and detectors.

Figure 3B:
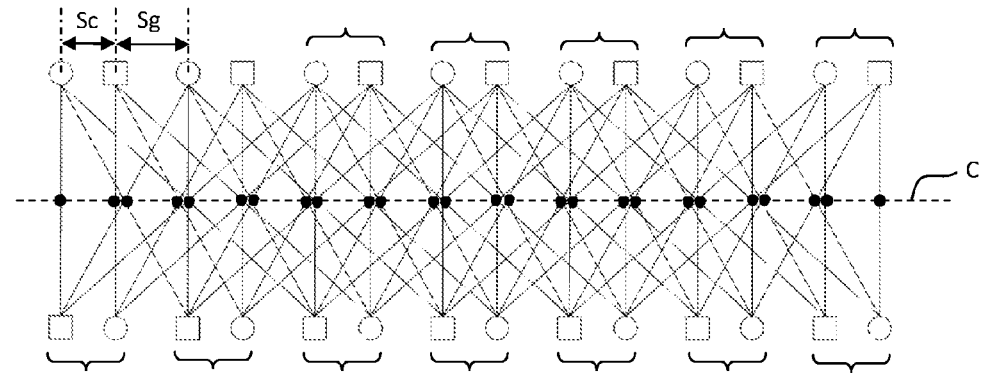
FIGS. 3B-3H illustrate the grid of detection lines when the apparatus in FIG. 3A is designed in accordance with embodiments of the invention.

In a first embodiment, shown in FIG. 3B, the alternating emitters and detectors are arranged in groups (indicated by brackets) consisting of one emitter and one detector, where the order of components in the groups is "reversed" between the upper and lower rows, since the upper row consists of emitter-detector-groups, whereas the lower row consists of detector-emitter-groups, as seen in a direction from left to right. Within each of these groups, the emitter and detector are spaced by an intra-group spacing $S_c$, and the different groups are spaced by an inter-group spacing $S_g$. The components are arranged with equal $S_c$ within all groups and with equal $S_g$ between all groups. In the illustrated example, $S_g/S_c=1.33$.

Figure 2:
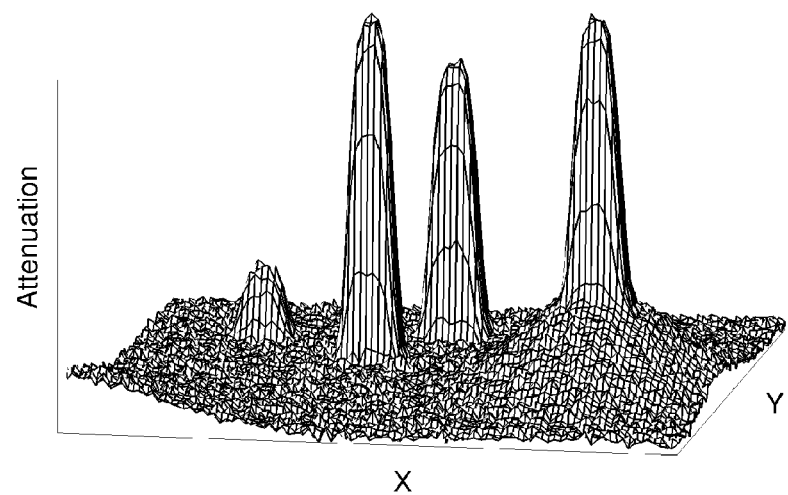
FIG. 2 is a 3D plot of an attenuation pattern generated based on energy signals from an optical touch-sensitive apparatus.

By comparing FIG. 3B and FIG. 3A, it is realized that the systematic grouping of components results in a doubled number of intersection points on the center line C. This means that the spatial resolution of the touch-sensitive apparatus is increased without increasing the number of components per unit length in the opposite rows. Thus, embodiments of the invention make it possible to attain a higher spatial resolution for a given number of electro-optical components (emitters and detectors). The grouping of components may be seen as leading to a separation of intersection points that overlap in the conventional fan beam arrangement of FIG. 3A. It is currently believed that a useful separation is achieved when $S_g/S_c$ exceeds about 1.2-1.3. Thereby, the grouping also results in a reduction, on average, in the number of detection lines that meet at each intersection point on the center line C. In the example of FIG. 3A, 5 detection lines meet at the intersection points on the center line C. In the example of FIG. 3B, 3 or 2 detection lines meet at each intersection point on the center line C. This has been found to enable a suppression of artifacts that may otherwise arise when the attenuation pattern is reconstructed using image reconstruction algorithms, e.g. algorithms for Filtered Back Projection. With the conventional fan beam arrangement in FIG. 3A, a larger number of projection signals are generally affected by objects that touch the intersection points on the center line C than by objects that touch the intersection points outside the center line C, since a touch on the center line C affects many more detection lines. Thereby, the image reconstruction algorithm may inherently over-emphasize regions near the center line, resulting in a locally increased sensitivity and a risk of enhancing noise and systematic errors in this region. Any such tendency is suppressed or at least reduced in the embodiment in FIG. 3B.

It should be noted that this advantageous effect is far from intuitive for the skilled person who is familiar with another class of optical touch systems, in which light is propagated in the free air above the touch surface and in which the location of touching objects is determined by detecting that the light paths across the touch surface are interrupted or blocked by the touching object. This class of optical touch systems is e.g. known from U.S. Pat. Nos. 6,690,363, 6,429,857, 7,042,444, US2010/0066016, U.S. Pat. No. 7,855,716, WO2010/081702 and WO2010/112404. As explained in WO2010/112404, to enable multi-touch determination of n–1 objects in simultaneous contact with a touch surface, each point on the touch surface needs to be passed by n different light paths. Thus, the general teaching is here that the emitters and detectors should be configured and arranged so as to maximize the number of intersecting propagation paths across the detection grid. In contrast, embodiments of the invention generally aim at reducing, on average, the number of intersecting propagation paths.

Figure 3C:
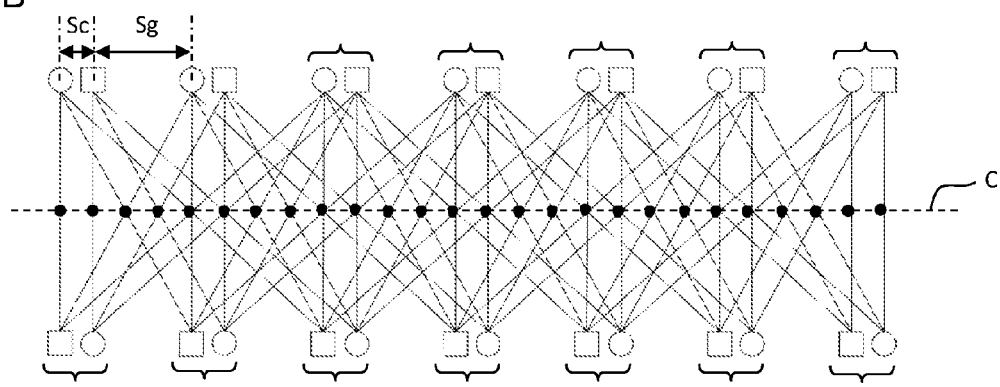

The arrangement in FIG. 3C is similar to the arrangement in FIG. 3B, but is designed with $S_g/S_c=3$, which results in a uniform spacing of intersection points on the center line C. This may or may not be a desired feature of the touch-sensitive apparatus, depending on implementation.

Figure 3D:
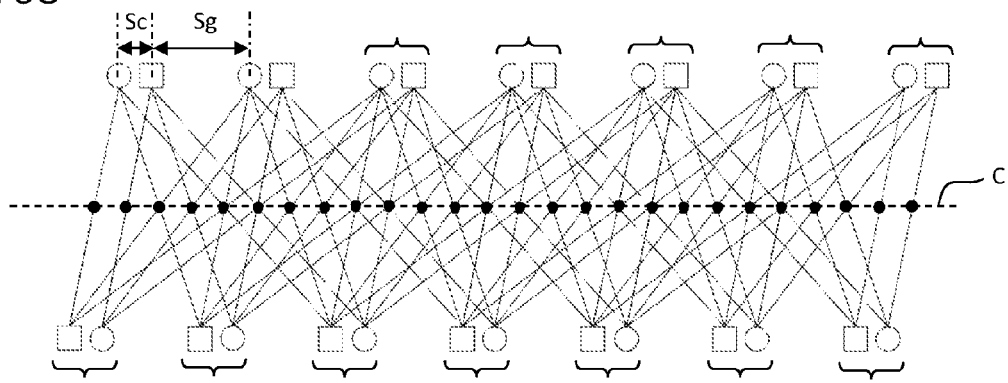

FIG. 3D is identical to FIG. 3C except for a relative displacement between the upper and lower rows. As seen, the spacing of intersection points on the center line C is the same as in FIG. 3C.

Figure 3E:
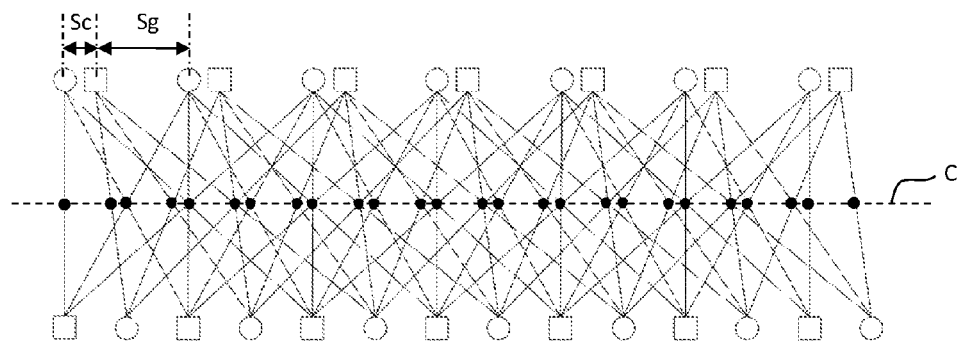

FIG. 3E illustrates a variant in which only the components in the upper row are arranged in groups. In the illustrated example, $S_g/S_c=3$. As seen, this also results in a doubled number of intersection points on the center line C compared to the conventional arrangement in FIG. 3A.

Figure 3F:
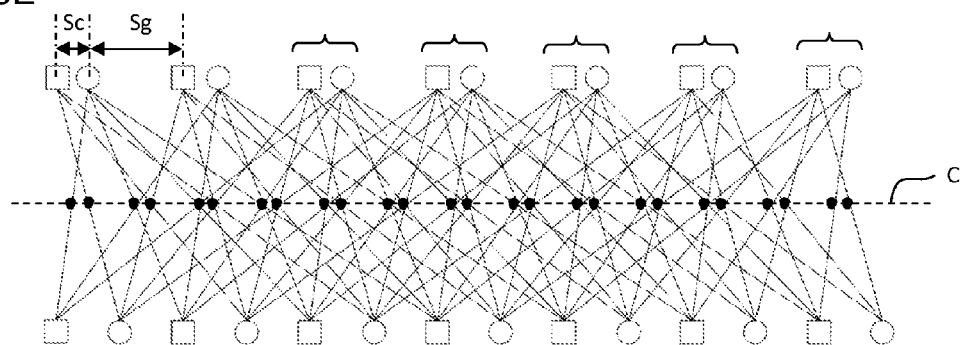

FIG. 3F illustrates a variant of the embodiment in FIG. 3E, with a different order of components within the groups in the upper row, i.e. detector-emitter-groups instead of emitter-detector groups as seen in a direction from left to right. The distribution of intersection points on the center line C is similar to the one in FIG. 3E.

Figure 3G:
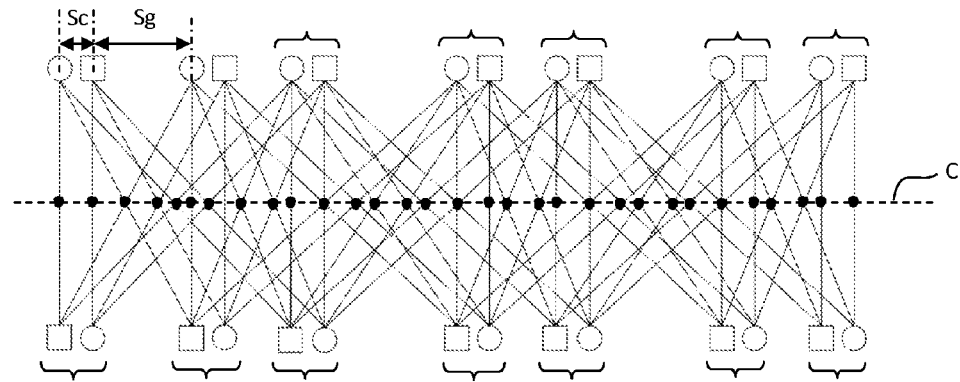

In a second embodiment, shown in FIG. 3G, the emitters and detectors are arranged in groups with identical intra-group spacing $S_g$ and with systematically varied inter-group spacing $S_c$. In the illustrated example, $S_g$ is alternately set to $2S_c$ and $4S_c$. As seen, this results in a varied spacing of intersection points on the center line C, which may or may not be a desirable feature. Furthermore, compared to the arrangements in FIGS. 3B-3D, the average number of detection lines at the intersection points on the center line C is reduced. In the example of FIG. 3G, there are 1 or 2 detection lines at each intersection point with the center line C. In a variant, not shown, the emitters and detectors may be arranged in groups with identical inter-group spacing $S_c$ and with systematically varied intra-group spacing $S_g$.

Figure 3H:
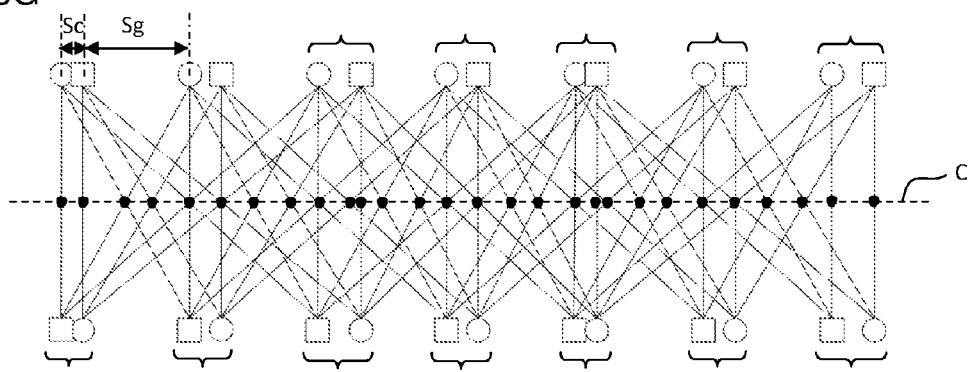

In a third embodiment, shown in FIG. 3H, the emitters and detectors are arranged in groups with systematically varied inter- and intra-group spacings $S_c$, $S_g$. In the illustrated example, $S_c$ iterates over the sequence: [$0.67S_c$, $S_c$, $1.33S_c$, $S_c$] from left to right along each of the rows, whereas $S_g$ iterates over the sequence: [$3.33S_c$, $3S_c$, 2.67, $3S_c$] from left to right along each of the rows. This is seen to result in a relatively uniform distribution of intersection points on the center line C, with 1 or 2 detection lines at each intersection point with the center line C.

Figure 4A:
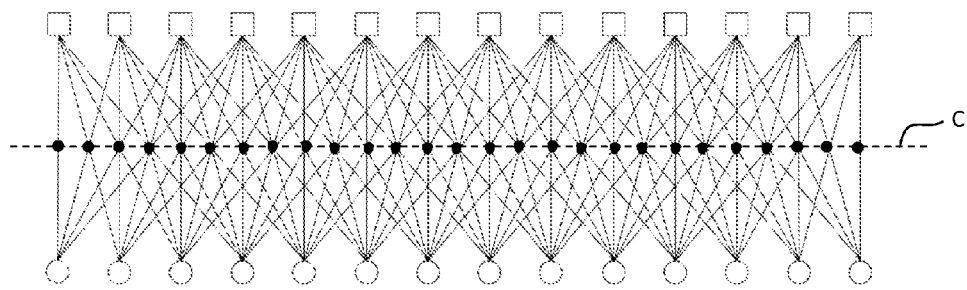
FIG. 4A illustrate a grid of detection lines in a prior art apparatus with separated emitter and detector sides.

Another conventional fan beam arrangement, denoted "non-interleaved arrangement" herein, is shown in FIG. 4A, in which the emitters are arranged with equal spacing on one end of the touch surface and the detectors are arranged with equal spacing on the opposite end. The non-interleaved arrangement results in a symmetric detection grid, and each intersection point on the center line C contains a large number of detection lines.

Figure 4B:
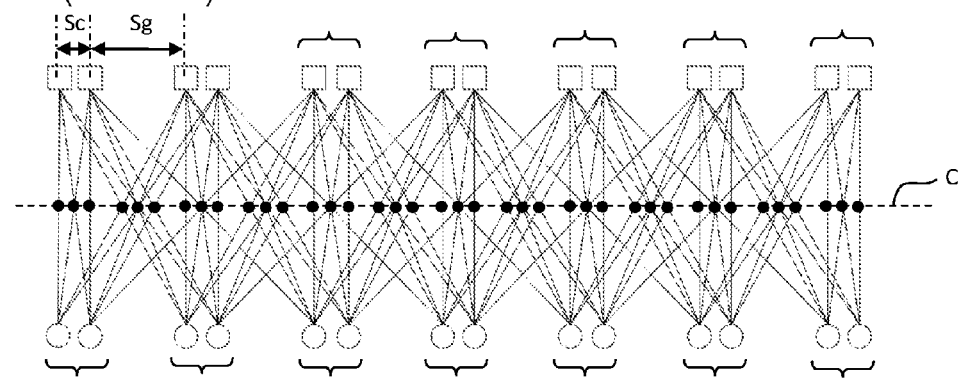
FIGS. 4B-4D illustrate the grid of detection lines when the apparatus in FIG. 4A is designed in accordance with embodiments of the invention.

The arrangement in FIG. 4A may be modified by systematically grouping the emitters and detectors in the same way as described in relation to FIGS. 3B-3H. As an example, FIG. 4B illustrates the result of grouping the detectors in the upper row and the emitters in the lower row two-by-two. In the illustrated example, $S_g/S_c=3$. As seen, the number of detection lines at the intersection points on the center line C is reduced from 4 detection lines per intersection point in FIG. 4A to either 1, 2 or 4 detection lines per intersection point in FIG. 4B. Thus, the example in FIG. 4B may serve to reduce the occurrence of the above-mentioned artifacts in the reconstructed attenuation pattern.

Figure 4C:
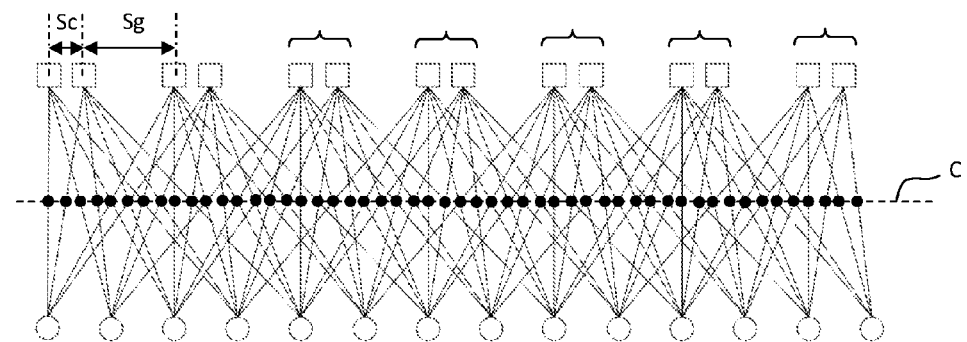

FIG. 4C illustrates the result of grouping only the detectors in the upper row two-by-two, using $S_g/S_c=3$. As seen, the result is a significantly decreased spacing of intersection points on the center line C, with 1 or 2 detection lines per intersection point. Furthermore, the intersection points are essentially uniformly spaced on the center line C, which may be a desirable feature. A similar result is obtained by grouping only the emitters in the lower row two-by-two.

Figure 4D:
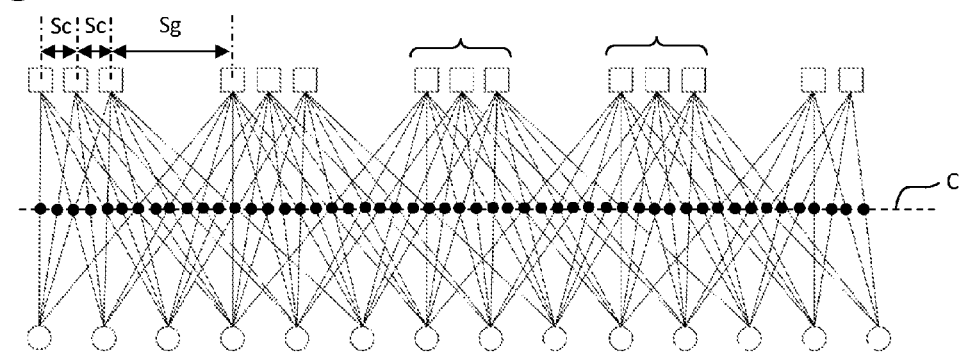

It is realized that the groups in all of the foregoing embodiments may contain more than two components. FIG. 4D illustrates a variant in which the detectors in the upper row are grouped three-by-three. As seen, the distributions of intersection points on the center line C is similar to the one in FIG. 4C.

Figure 5A:
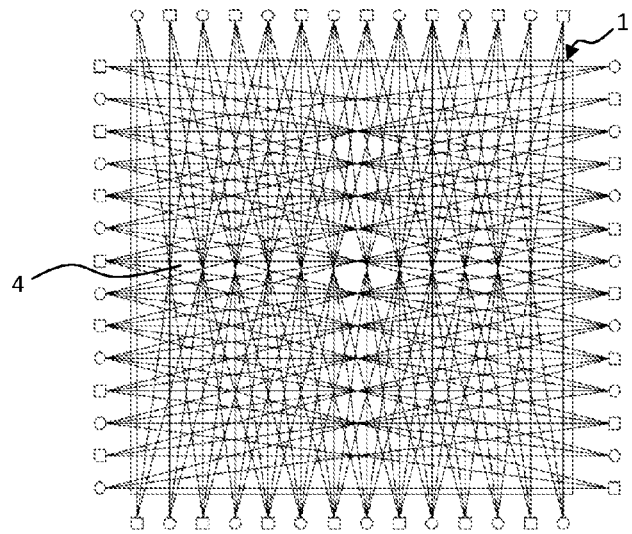
FIG. 5A illustrate a grid of detection lines in a prior art apparatus with two orthogonal sub-grids.
Figure 5B:
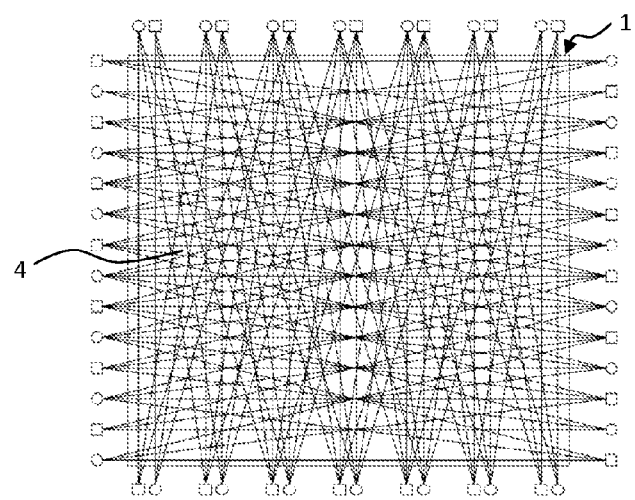
FIGS. 5B and 5C illustrate a corresponding grid of detection lines when the apparatus is designed in accordance with embodiments of the invention.
Figure 5C:
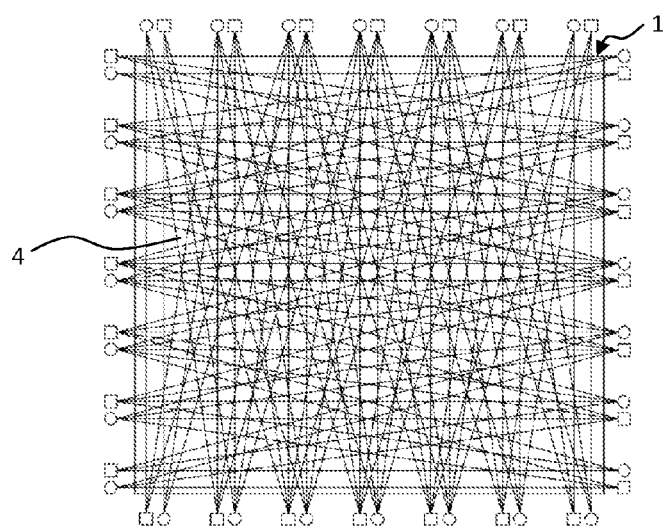

To further illustrate the utility of the embodiments of the invention, FIG. 5A is a top plan view of a rectangular panel 1 which is surrounded on four sides by horizontal and vertical rows of fan beam emitters and detectors which are conventionally arranged in alternating fashion with equal spacing. The horizontal rows define a first sub-grid, and the vertical rows define a second sub-grid. The first and second sub-grids overlap to define combined detection grid. As seen, the conventional arrangement results in horizontal and vertical bands of reduced spatial resolution along the center lines between the opposing rows of components. FIG. 5B illustrates a touch-sensitive apparatus with a conventional fan beam arrangement in the vertical rows and a grouping according to the first embodiment (FIG. 3C) in the horizontal rows. Compared to FIG. 5A, the horizontal bands are significantly suppressed. FIG. 5C illustrates a touch-sensitive apparatus with groupings according to the first embodiment (FIG. 3C) in both the vertical and horizontal rows. Compared to FIG. 5A, both the vertical and the horizontal bands are significantly suppressed. It should be noted that FIGS. 5A-5C omit a further sub-grid, which is defined between the pairs of horizontal and vertical rows.

As used herein, "horizontal" and "vertical" merely refer to directions on the drawings and does not imply any particular positioning of the panel 1.

The inventive grouping may thus be applied in one or both dimensions (horizontal or vertical) of the panel. It is to be noted that the inventive grouping of components may be applied in combination with any type of conventional arrangement of components, be it based on fan beams or collimated beams, as explained in the Background section. It is also conceivable that the inventive grouping is applied within only a portion of the opposite rows, while the rest of the opposite rows has a conventional arrangement of emitters and/or detectors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

Based on the present teachings, it is merely a matter of routine experimentation and optimization for the skilled person to design a systematic arrangement of the electro-optical components into spatially separated groups so as to achieve a desired property of overall detection grid, with respect to the spacing of intersection points along the center line, the uniformity of the intersection points across the entire touch surface, the average number of detection lines per intersection point on the center line, etc.

For example, the groups may contain more than two electro-optical components. It is even possible to use more than one type of group on either side, e.g. with respect to the number of components or the order of emitters and detectors. Furthermore, it is conceivable to use different groupings on the opposite sides, with respect to inter-group spacing, intra-group spacing, number of components in each group, etc.

Furthermore, all the above embodiments, examples, variants and alternatives given with respect to an FTIR-based touch system are equally applicable to a touch-sensitive apparatus that operates by transmission of other energy than light. In one example, the touch surface may be implemented as an electrically conductive panel, the emitters and detectors may be electrodes that couple electric currents into and out of the panel, and the output signal may be indicative of the resistance/impedance of the panel on the individual detection lines. In another example, the touch surface may include a material acting as a dielectric, the emitters and detectors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the detectors may be vibration sensors (e.g. acoustic or piezoelectric sensors).

The invention claimed is:

1. A touch-sensitive apparatus, comprising:
a panel defining a touch surface;
a first subset of components on a first end of the touch surface;
a second subset of components on a second end of the touch surface, the second end being opposite to, and parallel with, the first end;
wherein the components include emitters and detectors, each emitter configured to propagate a diverging energy beam across the touch surface, and each detector configured to detect transmitted energy from at least two of the emitters;
wherein the components in at least one of the first and second subsets are systematically arranged in spatially separate groups along at least one of the first and second ends;
wherein said at least one of the first and second subsets have an inter-group spacing between the groups of the respective subset and an intra-group spacing between the components within each of the groups of the respective subset;
wherein a ratio of the inter-group spacing between the groups of the respective subset to the intra-group spacing between the components within each group of the respective subset is greater than 1.2;
wherein the intra-group spacing between the components in each of the groups in said at least one of the first and second subsets is equal;
wherein the inter-group spacing between the groups of the respective subset is different; and wherein each of the groups includes at least two components.

2. The touch-sensitive apparatus of claim 1, wherein all groups include the same number of components.

3. The touch-sensitive apparatus of claim 1, wherein each of the first and second subsets contains an alternating sequence of emitters and detectors.

4. The touch-sensitive apparatus of claim 1, wherein the components in both the first subset and the second subset are systematically arranged in spatially separate groups along the first and second ends.

5. The touch-sensitive apparatus of claim 4, wherein
the groups in the first subset include a sequence of one emitter and one detector with respect to a reference direction along the first and second ends; and
the groups in the second subset include a sequence of one detector and one emitter with respect to the reference direction.

6. The touch-sensitive apparatus of claim 1, wherein the first subset includes only emitters and the second subset includes only detectors.

7. The touch-sensitive apparatus of claim 1, wherein
the components in the first subset are systematically arranged in spatially separate groups along the first end; and
the components in the second subset are arranged with equidistant spacing along at least the second end.

8. The touch-sensitive apparatus of claim 1, wherein said ratio of the inter-group spacing to the intra-group spacing is in the range of 1.3-8.

9. The touch-sensitive apparatus of claim 1, wherein the first and second subsets define a grid of transmission paths between the emitters and the detectors; and
the groups are systematically arranged so as to generate a decreased spacing of transmission paths along a center line between the first and second ends compared to an equidistant arrangement of the components in the first and second subsets.

10. The touch-sensitive apparatus of claim 1, wherein
the first and second subsets define transmission paths between the emitters and the detectors, said transmission paths forming intersection points with a center line between the first and second ends; and
the groups are systematically arranged so as to generate a decreased average number of transmission paths per intersection point compared to an equidistant arrangement of the components in the first and second subsets.

11. The touch-sensitive apparatus of claim 1, wherein
the panel defines a front surface and a back surface;
the emitters are configured to propagate the diverging energy beams by internal reflections in the front and back surfaces; and
the front surface includes the touch surface, and is configured to allow the diverging energy beams to be attenuated by objects in contact with the touch surface.

* * * * *

UNITED STATES PATENT AND TRADEMARK OFFICE
CERTIFICATE OF CORRECTION

PATENT NO. : 9,626,040 B2  
APPLICATION NO. : 14/402519  
DATED : April 18, 2017  
INVENTOR(S) : Mats Petter Wallander et al.

Page 1 of 1

It is certified that error appears in the above-identified patent and that said Letters Patent is hereby corrected as shown below:

On the Title Page

Insert:
--Related U.S. Application Data
(60) Provisional No. 61/650,618 filed May 23, 2012.--

Signed and Sealed this
Thirteenth Day of February, 2018

Andrei Iancu
*Director of the United States Patent and Trademark Office*